US011332016B2

(12) United States Patent
Hirai

(10) Patent No.: US 11,332,016 B2
(45) Date of Patent: May 17, 2022

(54) TRAIN IMAGE MONITORING SYSTEM

(71) Applicant: HITACHI KOKUSAI ELECTRIC INC., Tokyo (JP)

(72) Inventor: Seiichi Hirai, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 174 days.

(21) Appl. No.: 16/491,279

(22) PCT Filed: Mar. 27, 2017

(86) PCT No.: PCT/JP2017/012216
§ 371 (c)(1),
(2) Date: Sep. 5, 2019

(87) PCT Pub. No.: WO2018/179022
PCT Pub. Date: Oct. 4, 2018

(65) Prior Publication Data
US 2020/0023790 A1    Jan. 23, 2020

(51) Int. Cl.
*B61L 25/02* (2006.01)
*B60L 3/00* (2019.01)
(Continued)

(52) U.S. Cl.
CPC ............... *B60L 3/00* (2013.01); *B60K 35/00* (2013.01); *B60R 11/04* (2013.01);
(Continued)

(58) Field of Classification Search
CPC ..... B60L 3/00; B60K 35/00; B60K 2370/152; B60K 2370/171; B60K 2370/176;
(Continued)

(56) References Cited

U.S. PATENT DOCUMENTS 8,264,539 B2    9/2012  Takada
2005/0157509 A1*  7/2005  Tsukamoto .......... B60Q 1/1423
                                                    362/465
(Continued)

FOREIGN PATENT DOCUMENTS

EP    2290979 A1    3/2011
GB    2508743 B    6/2017
(Continued)

OTHER PUBLICATIONS

European search report dated Oct. 6, 2020 in corresponding European Patent Application. No. 17 902 879.0.
(Continued)

*Primary Examiner* — Patrick E Demosky
(74) *Attorney, Agent, or Firm* — Paul Teng

(57) ABSTRACT

Proposed is technology that enables the linked use of a camera and sensor system in a train image monitoring system. A train image monitoring system is characterized by, in a train monitoring system (100), the following: a control device (271) comprising a means for managing the device configuration of the system, a means for receiving data from each device, a means for determining the control contents of each device, and a means for transmitting a control instruction to each device; a recording device comprising a means for receiving data from each device, a means for recording received data, a means for reading out recorded data, a means for transmitting read-out data, and a means for receiving a control instruction; and a display device comprising a means for receiving data from the recording device, a means for displaying received data on a screen, a means for detecting a user operation, a means for transmitting the contents of a user operation, and a means for receiving a control instruction.

12 Claims, 5 Drawing Sheets

(51) Int. Cl.
*B60K 35/00* (2006.01)
*B60R 11/04* (2006.01)
(52) U.S. Cl.
CPC .. *B60K 2370/152* (2019.05); *B60K 2370/171* (2019.05); *B60K 2370/176* (2019.05); *B60R 2300/105* (2013.01); *B60Y 2200/31* (2013.01)
(58) Field of Classification Search
CPC .............. B60R 11/04; B60R 2300/105; B60Y 2200/31; B61L 25/023; B61L 25/021
See application file for complete search history.

(56) References Cited

U.S. PATENT DOCUMENTS

| | | | |
|---|---|---|---|
| 2007/0073484 A1* | 3/2007 | Horibe | G01S 17/931 701/301 |
| 2011/0069170 A1 | 3/2011 | Emoto et al. | |
| 2013/0241950 A1* | 9/2013 | Mihara | G09G 5/00 345/589 |
| 2013/0321630 A1* | 12/2013 | Shin | G08G 1/167 348/148 |
| 2015/0281652 A1 | 10/2015 | Morimoto | |
| 2017/0106885 A1* | 4/2017 | Singh | G01B 11/22 |
| 2017/0305427 A1* | 10/2017 | Kim | B60W 10/30 |
| 2018/0137377 A1* | 5/2018 | Nishida | G08G 1/0129 |

FOREIGN PATENT DOCUMENTS

| | | |
|---|---|---|
| JP | 2002-274257 | 9/2002 |
| JP | 2005-167842 | 6/2005 |
| JP | 2008-299950 | 12/2008 |
| JP | 2009-93076 | 4/2009 |
| JP | 2009-273009 | 11/2009 |
| JP | 2010-28754 | 2/2010 |
| JP | 2012-129908 | 7/2012 |
| JP | 2012129908 A * | 7/2012 |
| JP | 2013-25523 | 2/2013 |

OTHER PUBLICATIONS

International Search Report dated Jun. 13, 2017 for International Application No. PCT/JP2017/012216 filed Mar. 27, 2017.

* cited by examiner

TRAIN IMAGE MONITORING SYSTEM

TECHNICAL FIELD

The present invention relates to a train image monitoring system mounted on a train.

BACKGROUND ART

In recent years, cameras have been digitized and reduced in sizes and prices. Cameras and recorders are mounted on mobile bodies such as automobiles in more cases for various uses such as fact proving in accidents, crime prevention, and automatic driving. For example, there is a technique mounted on mobile bodies such as trains to transfer photographed image data to an external image recording device according to necessity (see, for example, Patent Literature 1). On the other hand, according to the progress of a sensing technique, sensors are mounted in more cases for uses such as control of the mobile bodies.

CITATION LIST

Patent Literature

PATENT LITERATURE 1: JP-A-2010-28754

SUMMARY OF INVENTION

Technical Problem

Incidentally, monitoring cameras and recorders are mounted in railroad trains as well in more cases. Sensor systems such as vibration sensors and noise sensors are mounted in more cases. However, the monitoring cameras and the recorders and the sensor systems are mounted and used as independent individual systems. There has been a demand for a technique that enables effective use of the monitoring cameras and the recorders and the sensor systems.

The present invention has been devised in view of such circumstances, and an object of the present invention is to solve the problems.

Solution to Problem

The present invention provides a train image monitoring system in which cameras, sensors that acquire surrounding situations, and a control device that controls the cameras and the sensors are connected by a network and mounted on a train. The cameras and the sensors are mounted on a plurality of cars that form the train. The sensors can be linked with the cameras. The control device executes, based on data of the camera or the sensor mounted on one car, linked control for controlling operations of the cameras or the sensors in other cars.

A display device that displays the data of the cameras and the sensors in association with a setting form of the cameras and the sensors in the train may be connected by the network.

When the linked control is executed, the display device may distinguishably display the linked cameras or sensors.

The control device may execute the linked control when a threshold of the data of the sensors is exceeded.

The display device may distinguishably display the data of the sensors exceeding the threshold.

At least one of the sensors may be an illuminometer, and the control device may store therein a first threshold used outside a tunnel and a second threshold used inside the tunnel and may switch the first threshold to the second threshold when illuminance data of the illuminometer falls and switch the second threshold to the first threshold when the illuminance data of the illuminometer rises.

Advantageous Effects of Invention

According to the present invention, it is possible to perform linked use of cameras and sensor systems in a train image monitoring system.

DESCRIPTION OF EMBODIMENTS

Figure 1:
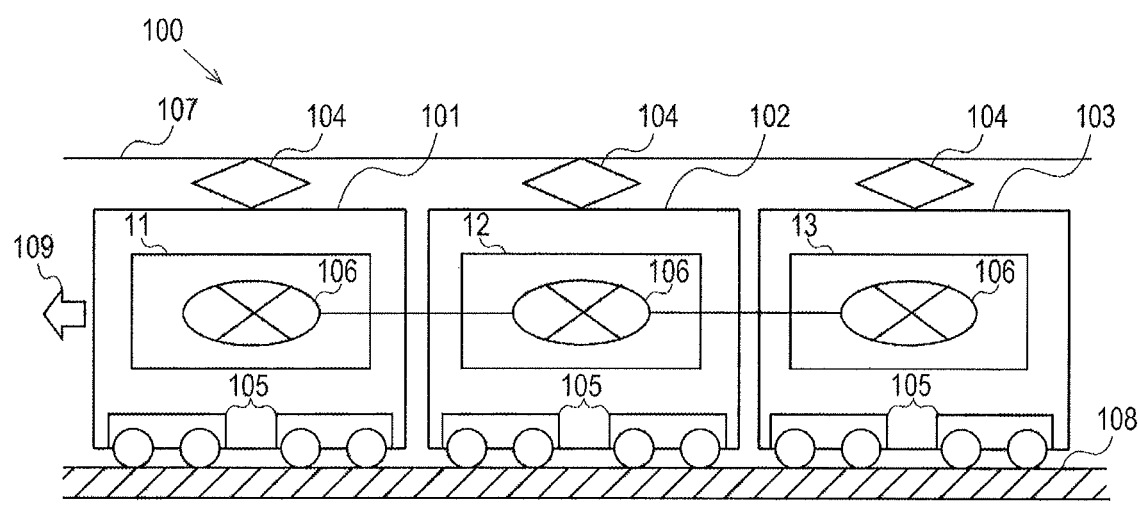
FIG. 1 is a diagram showing an overview of a train monitoring system mounted on a train in an embodiment of the present invention.

A mode for carrying out the present invention (hereinafter simply referred to as "embodiment") is specifically explained with reference to the drawings. One formation of a train including a train monitoring system 100 according to this embodiment is schematically shown in FIG. 1. This train is configured as one formation by connecting a leading first car 101, a second car 102 in the middle, and a third car 103 in the end. The train travels in the left direction in the figure (a direction of a left arrow 109) on a railroad 108.

Each of the first car 101, the second car 102, and the third car 103 includes one pantograph 104 in an upper part of the car. Note that a plurality of pantographs 104 may be provided in each car. Electric power is supplied from an overhead wire 107 to the first car 101, the second car 102, and the third car 103 via the pantographs 104. Each of the first car 101, the second car 102, and the third car 103 includes trucks 105 in a lower part of the car. Two trucks 105 are provided in each car. However, this does not mean to limit the number of trucks 105 to two.

Networks 106 are provided in the first car 101, the second car 102, and the third car 103. Data communication can be mutually performed among the cars. Network connection may be either wired or wireless.

As elements configuring the train monitoring system 100, a first car monitoring system 11, a second car monitoring system 12, and a third car monitoring system 13 are respectively provided in the first car 101, the second car 102, and the third car 103 and are communicably connected to one another by the networks 106.

A specific configuration of the train monitoring system 100 (the first to third car monitoring systems 11 to 13) is explained with reference to FIG. 2A to FIG. 2C.

Figure 2A:
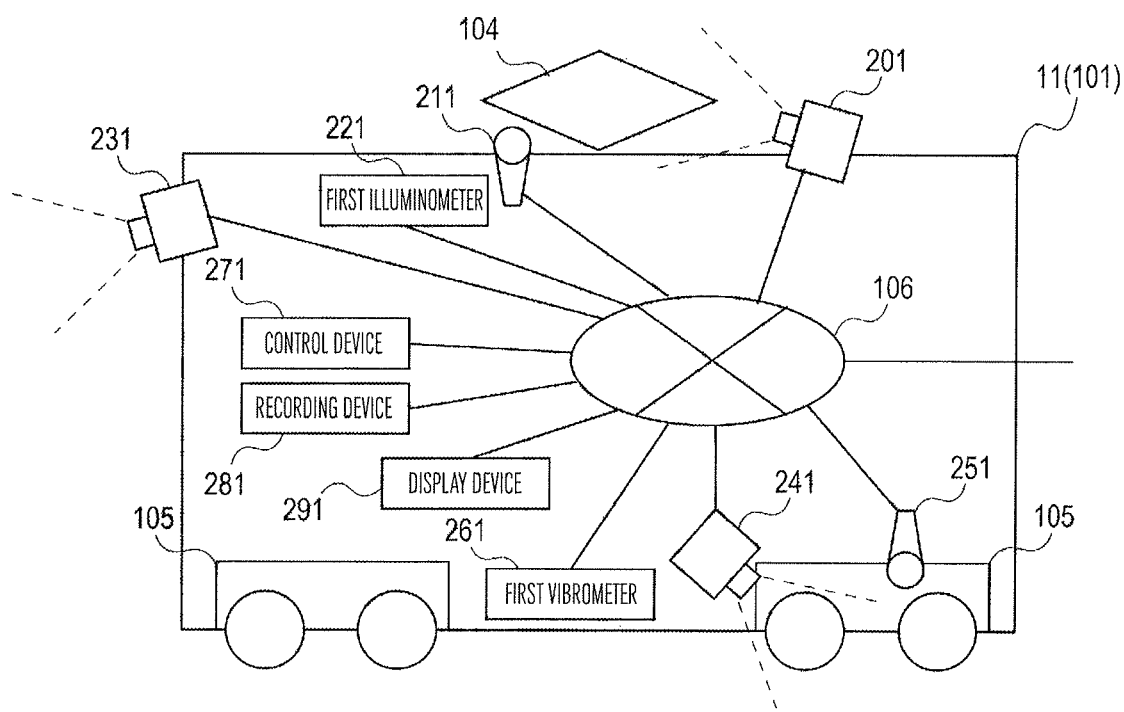
FIG. 2A is a diagram showing the configuration of a first car monitoring system in the embodiment of the present invention.

FIG. 2A shows the configuration of the first car monitoring system 11 mounted on the first car 101.

A first pantograph camera 201, a first pantograph noise meter 211, and a first illuminometer 221 are set in an upper part of the first car 101.

The first pantograph camera 201 photographs the pantograph 104 as a main object. The first pantograph camera 201 includes a zoom lens capable of performing distance control and focus control, an imaging element such as a CCD or a CMOS, an A/D circuit, a temporary storage memory such as a RAM, a data transfer bus, a timing circuit, an external input/output interface, a power supply circuit, and an illumination such as a visible-light light or a near infrared LED.

The first pantograph camera 201 converts light passed through a lens into an electric signal with the imaging element, performs digital conversion of the electric signal with the A/D circuit, and stores the electric signal in the temporary storage memory as image data.

The stored image data is output from the external input/output interface to the network 106 according to a data request from the outside input to the external input/output interface, an instruction from the timing circuit, or the like. Image resolution, an image generation interval, a distance and a focus of the lens, an amount of illumination, and the like are changed according to a control command from the outside also input to the external input/output interface.

Note that the first pantograph camera 201, a second pantograph camera 202, a third pantograph camera 203, a front camera 231, a rear camera 233, and first to third truck cameras 241 to 243 have the same basic configuration and function. In the following explanation, the same configuration and function are omitted as appropriate. Unless particularly distinguished, the cameras are simply referred to as "cameras 300". The configuration and the function of the cameras 300 are explained below with reference to FIG. 3A.

The first pantograph noise meter 211 is set around the pantograph 104 and collects noise that occurs around the pantograph 104. The first pantograph noise meter 211 includes a microphone, an A/D circuit, a temporary storage memory such as a RAM, a data transfer bus, a timing circuit, an external input/output interface, and a power supply circuit. The first pantograph noise meter 211 converts vibration of air into an electric signal with the microphone, performs digital conversion of the electric signal with the A/D circuit, and stores the electric signal in the temporary storage memory as noise data. The stored noise data is output from the external input/output interface to the network 106 according to a data request from the outside input to the external input/output interface, an instruction from the timing circuit, or the like. Note that one first pantograph noise meter 211 is shown in the figure. However, a plurality of first pantograph noise meters 211 may be set.

The first illuminometer 221 is set around the pantograph 104 and measures illuminance around the pantograph 104. The first illuminometer 221 is a device including a photodiode, an A/D circuit, a temporary storage memory such as a RAM, a data transfer bus, a timing circuit, an external input/output interface, and a power supply circuit. The first illuminometer 221 converts incident light into an electric signal with the photodiode, performs digital conversion of the electric signal with the A/D circuit, and stores the electric signal in the temporary storage memory as illuminance data. The stored illuminance data is output to the network 106 according to a data request from the outside input to the external input/output interface, an instruction from the timing circuit, or the like. Note that one first illuminometer 221 is shown in the figure. However, a plurality of first illuminometers 221 may be set.

The front camera 231 is set in a front upper part of the first car 101. The front camera 231 photographs a traveling direction (the left arrow 109) as a main object. Photographed image data is output from the external input/output interface to the network 106 according to a data request from the outside, an instruction from the timing circuit, or the like.

The first truck camera 241 and a first truck noise meter 251 are set around the truck 105 in a lower part of the first car 101. One first truck camera 241 and one first truck noise meter 251 are shown in the figure. However, a plurality of first truck cameras 241 and a plurality of first truck noise meters 251 may be set.

The first truck camera 241 photographs the truck 105 and the railroad 108 as main objects. Photographed image data is output to the network 106 according to a data request from the outside, an instruction from the timing circuit, or the like.

The first truck noise meter 251 collects noise that occurs around the truck 105. The first truck noise meter 251 includes a microphone, an A/D circuit, a temporary storage memory such as a RAM, a data transfer bus, a timing circuit, an external input/output interface, and a power supply circuit. The first truck noise meter 251 converts vibration of air into an electric signal with the microphone, performs digital conversion of the electric signal with the A/D circuit, and stores the electric signal in the temporary storage memory as noise data. The stored noise data is output from the external input/output interface to the network 106 according to a data request from the outside input to the external input/output interface, an instruction from the timing circuit, or the like. Note that a second truck noise meter 252 of the second car 102 and a third truck noise meter 253 of the third car 103 have the same configuration and function. In the following explanation, explanation of the configuration and the function is omitted as appropriate.

A first vibrometer 261 measures vibration information of the first car 101. The first vibrometer 261 includes a vibration sensor that measures vibration, an A/D circuit, a temporary memory such as a RAM, a data transfer bus, a timing circuit, an external input/output interface, and a power supply circuit. The first vibrometer 261 converts vibration into an electric signal through induction, performs digital conversion of an electric signal with the A/D circuit, and stores the electric signal in the temporary storage memory as vibration data. The stored vibration data is output from the external input/output interface to the network 106 according to a data request from the outside input to the external input/output interface, an instruction from the timing circuit, or the like. One first vibrometer 261 is shown in the figure. However, a plurality of first vibrometers 261 may be set. Note that a second vibrometer 262 of the second car 102 and a third vibrometer 263 of the third car 103 explained below have the same configuration and function. In the following explanation, explanation of the configuration and the function is omitted as appropriate.

The first to third pantograph noise meters 211 to 213, the first to third illuminometers 221 to 223, the first to third truck noise meters 251 to 253, and the first to third vibrometers 261 to 263 have the same conceptual configuration and function of a sensing function. Therefore, unless particularly distinguished, the meters are simply referred to as "sensors 310" and the configuration and the function of the sensors 310 are explained below with reference to FIG. 3B.

A control device 271, a recording device 281, and a display device 291 are set in the first car 101. A configuration is illustrated in which one control device 271, one recording device 281, and one display device 291 are respectively set in the first car 101. However, this does not mean to limit the devices to this configuration. For example, the control device 271, the recording device 281, and the display device 291 may be set in any car of the other second and third cars 102 and 103 or pluralities of control devices 271, recording devices 281, and display devices 291 may be set.

The control device 271 collectively controls the components of the train monitoring system 100 and performs control of various kinds of information collection, operation instructions, and the like. The control device 271 is a device such as a computer including an arithmetic circuit such as a CPU, a temporary storage memory such as a RAM, a recording medium such as an HDD, a data transfer bus, a timing circuit, an external input/output interface, and a power supply circuit.

The recording device 281 is a device that records image data output from the first pantograph camera 201, the second pantograph camera 202 and the third pantograph camera 203 of the other cars, the front camera 231, the rear camera 233 explained below, the first truck camera 241, the second truck camera 242 and the third truck camera 243 of the other cars, and the like, and sensor data output from the pantograph noise meters, the truck noise meters, the vibrometers, the illuminometers, and the like.

The recording device 281 is a device such as a network digital recorder including an arithmetic circuit such as a CPU, a temporary memory such as a RAM, a storage medium such as an HDD, a data transfer bus, a timing circuit, an external input/output interface, and a power supply circuit.

The recording device 281 records image data from the cameras input from the network 106 to the external input/output interface in the recording medium such as the HDD together with data time of the image data. The recorded image data is output from the external input/output interface to the network according to a data request from the outside input to the external input/output interface, an instruction from the timing circuit, or the like. The data request includes the data time. The recording device 281 outputs the image data that is reproduced starting from the data time included in the data request.

The recording device 281 records sensor data from the noise meters (the first to third pantograph noise meters 211 to 213 and the first to third truck noise meters 251 to 253), the vibrometers (the first to third vibrometers 261 to 263), and the illuminometers (the first to third illuminometers 221 to 223) input from the network 106 to the external input/output interface in the recording medium such as the HDD together with data time of the sensor data. The recorded sensor data is output from the external input/output interface to the network 106 according to a data request from the outside input to the external input/output interface, an instruction from the timing circuit, or the like. The data request includes data time. The recording device 281 outputs the sensor data that is reproduced starting from the data time included in the data request.

The display device 291 screen-displays the image data and the sensor data. The display device 291 includes an arithmetic circuit such as a CPU, a temporary storage memory such as a RAM, a recording medium such as an HDD, a data transfer bus, an external input/output interface, a power supply circuit, a screen such as a liquid crystal display, a user input device such as a keyboard and a mouse or a touch panel, and a sound output device such as a buzzer.

The display device 291 stores the image data and the sensor data input from the network 106 to the external input/output interface in the temporary storage memory. The display device 291 converts the stored image data and sensor data into a form suitable for display using the arithmetic circuit and screen-displays the image data and the sensor data. User operation on the display device 291 is performed on the user input device.

Figure 2B:
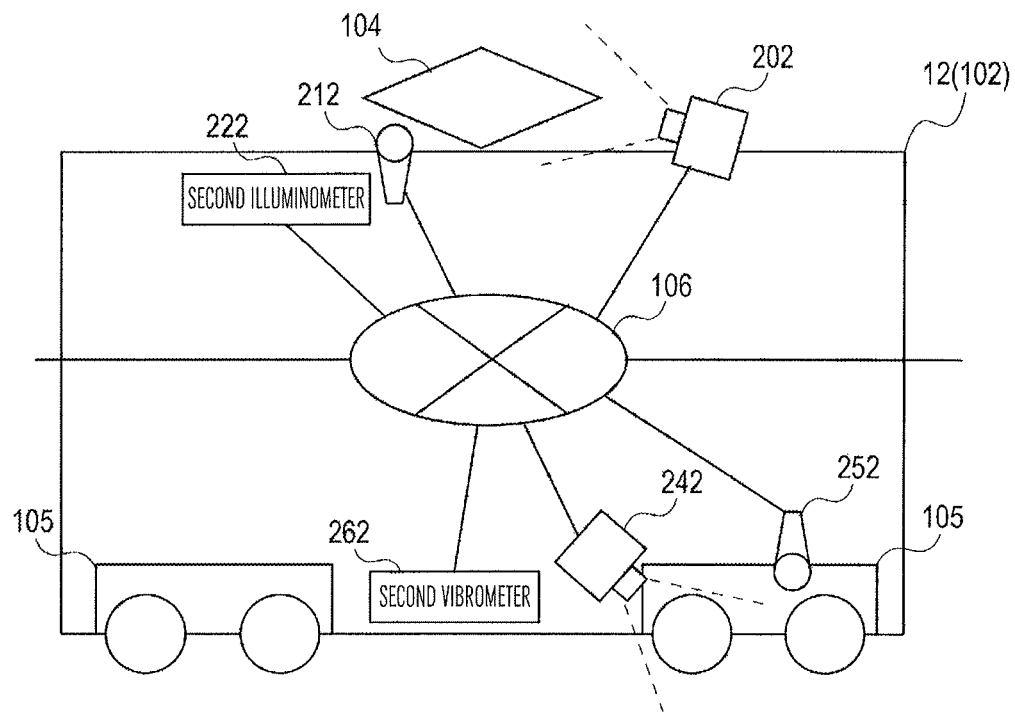
FIG. 2B is a diagram showing the configuration of a second car monitoring system in the embodiment of the present invention.

FIG. 2B shows the configuration of the second car monitoring system 12 mounted on the second car 102. The second car monitoring system 12 has a configuration in which the front camera 231, the control device 271, the recording device 281, and the display device 291 are omitted from the first car monitoring system 11. That is, the second car monitoring system 12 includes the second pantograph camera 202, the second pantograph noise meter 212, the second illuminometer 222, the second truck camera 242, the second truck noise meter 252, and the second vibrometers 262.

As explained above, the second pantograph camera 202, the second pantograph noise meter 212, the second illuminometer 222, the second truck camera 242, the second truck noise meter 252, and the second vibrometer 262 respectively have the same configurations, functions, and setting forms as the first pantograph camera 201, the first pantograph noise meter 211, the first illuminometer 221, the first truck camera 241, the first truck noise meter 251, and the first vibrometer 261.

Figure 2C:
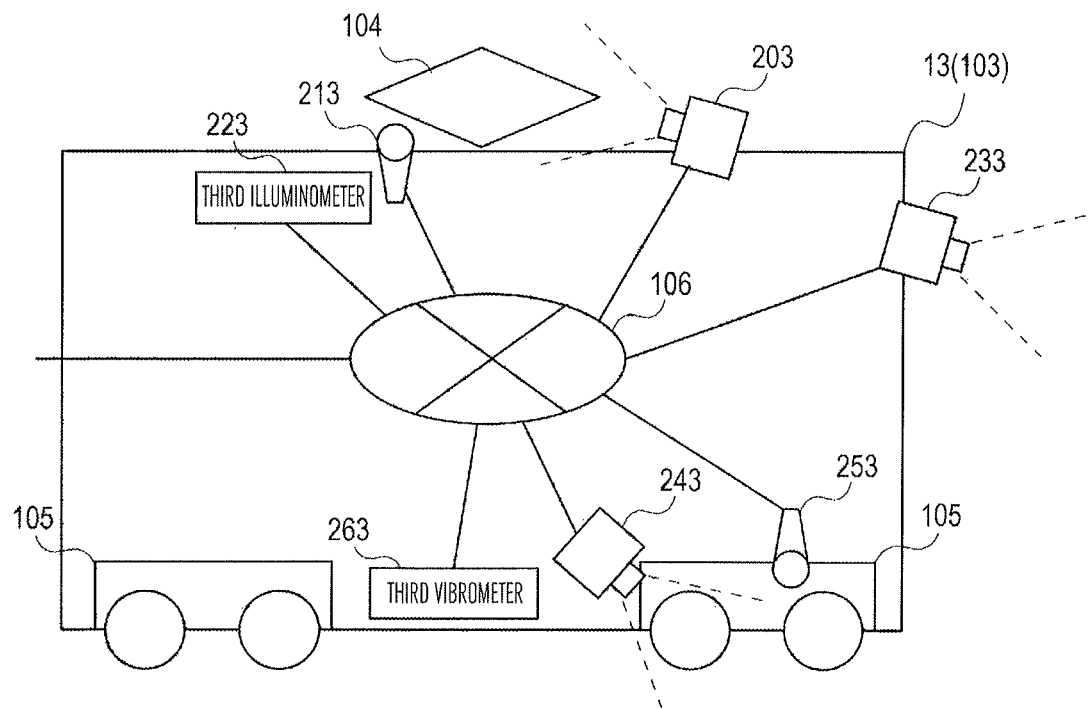
FIG. 2C is a diagram showing the configuration of a third car monitoring system in the embodiment of the present invention.

FIG. 2C shows the configuration of the third car monitoring system 13 mounted on the third car 103. The third car monitoring system 13 has a configuration in which the rear camera 233 is added to the second car monitoring system 12. That is, the third car monitoring system 13 includes the third pantograph camera 203, the third pantograph noise meter 213, the third illuminometer 223, the third truck camera 243, the third truck noise meter 253, the third vibrometer 263, and the rear camera 233.

As explained above, the third pantograph camera 203, the third pantograph noise meter 213, the third illuminometer 223, the third truck camera 243, the third truck noise meter 253, and the third vibrometer 263 respectively have the same configurations, functions, and setting forms as the first pantograph camera 201, the first pantograph noise meter 211, the first illuminometer 221, the first truck camera 241, the first truck noise meter 251, and the first vibrometer 261.

The rear camera 233 is set in a rear part of the third car 103 and photographs a car traveling opposite direction (that is, the opposite direction of the traveling direction) as a main object. The rear camera 233 is output to the network 106 according to a data request from the outside, an instruction from the timing circuit, or the like. The rear camera 233 changes image resolution, an image generation interval, a distance and a focus of the lens, an amount of illumination, and the like according to a control command from the outside also input to the external input/output interface.

Figure 3A:
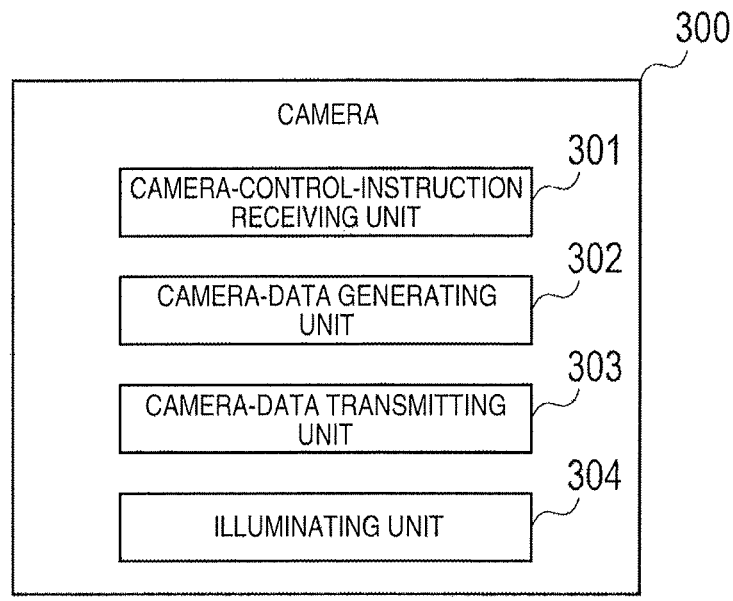
FIG. 3A is a diagram showing the configuration of a camera in the embodiment of the present invention.

FIG. 3A is a block diagram showing a basic configuration of the camera 300. The camera 300 includes a camera-control-instruction receiving unit 301, a camera-data generating unit 302, a camera-data transmitting unit 303, and an illuminating unit 304.

The camera-control-instruction receiving unit 301 receives, via the external input/output interface, a control command sent from the control device 271.

The camera-data generating unit 302 is a processing unit that generates image data. The image data is compressed image data of, for example, JPEG, MPEG, or H.264. The camera-data generating unit 302 performs image compression and embeds time of the generation of the image data in the data as data time.

The camera-data transmitting unit 303 transmits the image data to the outside via the external input/output interface. A transmission destination is instructed by a control command.

The illuminating unit 304 performs adjustment of ON/OFF and brightness of illumination according to an instruction of the control command.

Figure 3B:
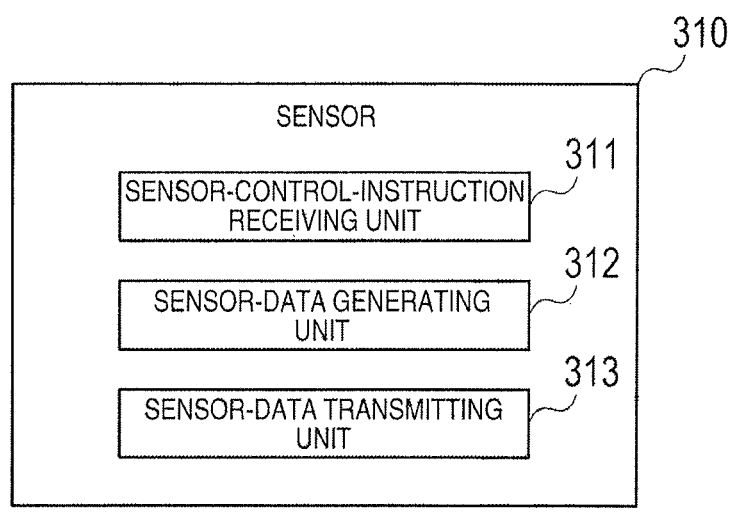
FIG. 3B is a diagram showing the configuration of a sensor in the embodiment of the present invention.

FIG. 3B shows the configuration of the sensor 310. The sensor 310 includes a sensor-control-instruction receiving unit 311, a sensor-data generating unit 312, and a sensor-data transmitting unit 313.

The sensor-control-instruction receiving unit 311 receives, via the external input/output interface, a control command sent from the control device 271.

The sensor-data generating unit 312 generates sensor data. For example, in the case of a noise meter, the sensor data is decibel value data. In the case of an illuminometer, the sensor data is lux data. The sensor-data generating unit 312 embeds time of the generation of the sensor data in the data as data time.

The sensor-data transmitting unit 313 transmits the sensor data to the outside via the external input/output interface. A transmission destination is instructed by a control command.

Figure 3C:
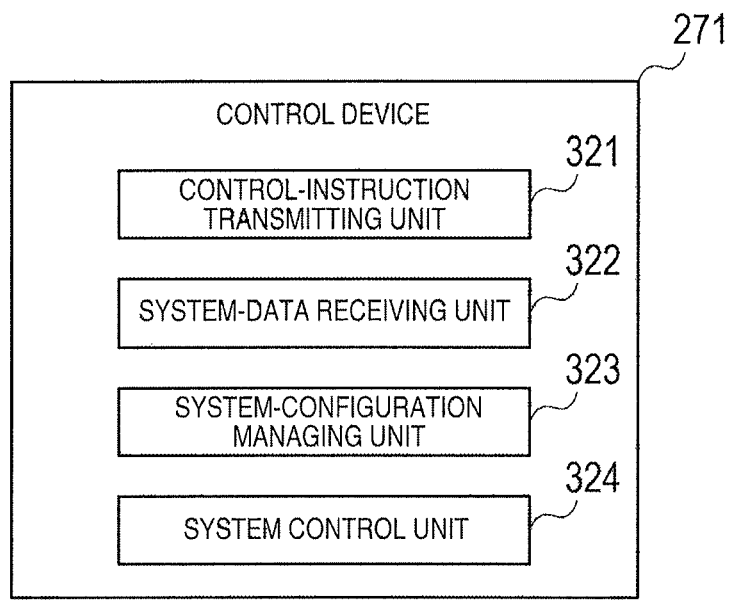
FIG. 3C is a diagram showing the configuration of a control device in the embodiment of the present invention.

FIG. 3C shows a functional configuration of the control device 271. The control device 271 includes a control-instruction transmitting unit 321, a system-data receiving unit 322, a system-configuration managing unit 323, and a system control unit 324.

The control-instruction transmitting unit 321 transmits, via the external input/output interface, control instruction commands to the devices connected to the train monitoring system 100. The control instruction command is, for example, a command for requesting the cameras 300 (the first to third pantograph cameras 201 to 203, the front camera 231, the rear camera 233, and the first to third truck cameras 241 to 243) to output image data. The control instruction command is, for example, a command for requesting the sensors 310 (the pantograph noise meters, the truck noise meters, and the vibrometers) to output sensor data. The control instruction command is, for example, a command for requesting the cameras 300 to change an illumination amount. The control instruction command is, for example, a command for requesting the recording device 281 to start and end recording.

The system-data receiving unit 322 receives data output from the devices. The system-data receiving unit 322 receives image data output from the cameras 300, sensor data output from the sensors 310, and operation data output from the display device 291.

The system-configuration managing unit 323 is, for example, a database on a recording medium that records and manages a device configuration of the train monitoring system 100. The system-configuration managing unit 323 stores therein a correspondence relation between the devices and the cars (the first to third cars 101 to 103), a correspondence relation between the first to third pantograph cameras 201 to 203 and the first to third pantograph noise meters 211 to 213 corresponding to the first to third pantograph cameras 201 to 203, and communication destination addresses to the first to third truck cameras 241 to 243 and the first to third truck noise meters 251 to 253 corresponding to the first to third truck cameras 241 to 243 and the devices and stores therein, when the device is the camera 300, image resolution and an image generation interval of the camera 300.

The communication destination addresses are, for example, IP addresses. The image resolution is, for example, the numbers of pixels in the longitudinal direction and the lateral direction of an image and a product of the numbers of pixels. The image generation interval is, for example, fps (frame per second). These data are given beforehand. A method of giving the data may be any method.

The system control unit 324 instructs processing of the control-instruction transmitting unit 321, the system-data receiving unit 322, and the system-configuration managing unit 323.

Figure 3D:
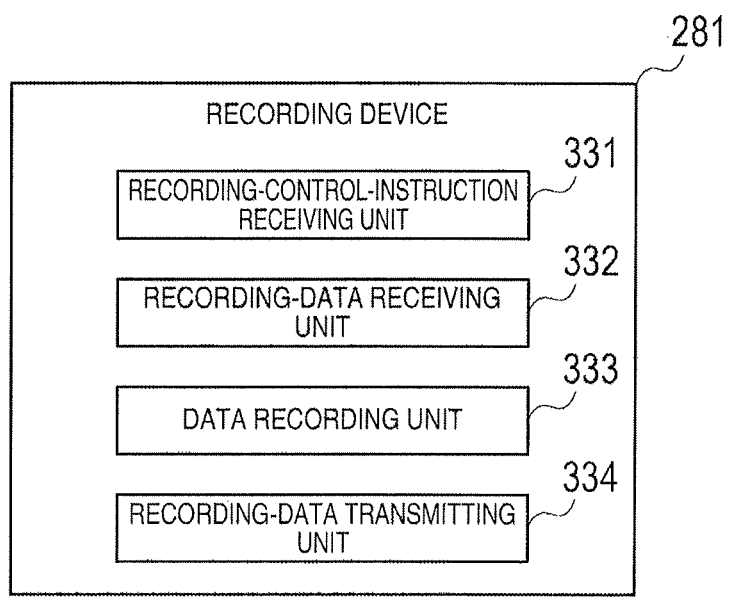
FIG. 3D is a diagram showing the configuration of a recording device in the embodiment of the present invention.

FIG. 3D shows a functional configuration of the recording device 281. The recording device 281 includes a recording-control-instruction receiving unit 331, a recording-data receiving unit 332, a data recording unit 333, and a recording-data transmitting unit 334.

The recording-control-instruction receiving unit 331 receives, via the external input/output interface, a control command sent from the control device 271. The recording-data receiving unit 332 receives data output from the devices. The recording-data receiving unit 332 receives image data output from the cameras 300 or sensor data output from the sensors 310.

The data recording unit 333 is, for example, a database on a recording medium that writes the data received by the recording-data receiving unit 332 in the recording medium. The data recording unit 333 stores therein the image data received from the cameras 300 and the sensor data received from the sensors 310. When storing the data, the data recording unit 333 stores therein, in addition to the data, generation time of the data.

Similarly, the data recording unit 333 records generation source IDs of the data as well. The generation source IDs may be, for example, numbers, IP addresses, or the like uniquely allocated to the devices connected to the train monitoring system 100. Similarly, the data recording unit 333 records data IDs as well. The data IDs may be, for example, serial numbers unique for each of the generation source IDs.

The data recording unit 333 reads data recorded in the recording medium. When reading the data, the data recording unit 333 specifies target data according to the generation source ID, the data ID, and the data time.

The recording-data transmitting unit 334 transmits the data read out by the data recording unit 333 to a data request source via the external input/output interface.

Figure 3E:
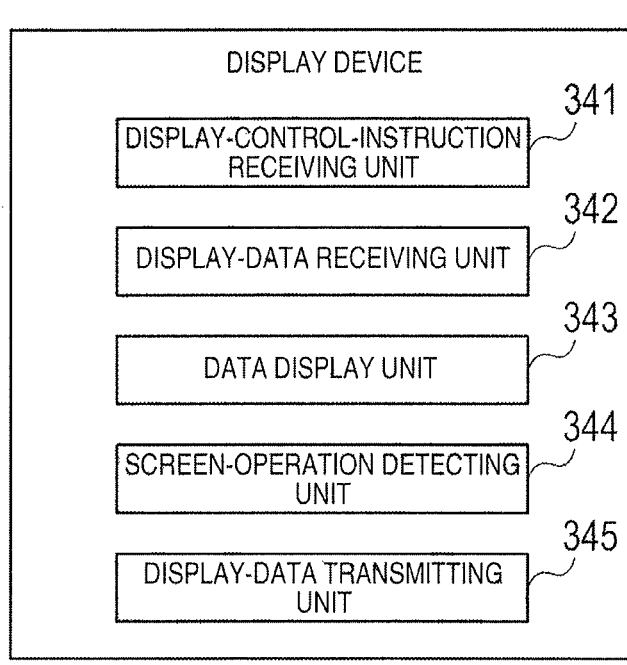
FIG. 3E is a diagram showing the configuration of a display device in the embodiment of the present invention.

FIG. 3E shows a functional configuration of the display device 291. The display device 291 includes a display-control-instruction receiving unit 341, a display-data receiving unit 342, a data display unit 343, a screen-operation detecting unit 344, and a display-data transmitting unit 345.

The display-control-instruction receiving unit 341 receives, via the external input/output interface, a control command sent from the control device 271.

The display-data receiving unit 342 receives data output from the recording device 281. The display-data receiving unit 342 receives image data of the cameras 300 recorded in the recording device 281 or sensor data of the sensors 310 recorded in the recording device 281.

The data display unit 343 converts the data received by the display-data receiving unit 342 into a form recognizable by a user and displays the data on a screen. For example, in the case of the image data, the data display unit 343 develops a compressed image, converts the compressed image into an RGB form, and displays the compressed image.

The screen-operation detecting unit 344 performs detection and acquisition of operation content by the user. The screen-operation detecting unit 344 detects, for example, mouse click or button pressing by panel touch.

The display-data transmitting unit 345 transmits operation data detected and acquired by the screen-operation detecting unit 344 to the control device 271 via the external input/output interface.

<Initial Control Example>

An example of processing content of the control device 271 during a system start of the train monitoring system 100 is explained. In this example, the system start is performed before a traveling start of the train.

First, in the control device 271, in response to the system start, the system control unit 324 instructs the control-instruction transmitting unit 321 to transmit an initial control instruction command to the devices.

Subsequently, in the control device 271, the control-instruction transmitting unit 321 transmits a data recording start command to the recording device 281. In the recording device 281, the recording-control-instruction receiving unit 331 receives the command, the recording-data receiving unit 332 starts data reception from the devices, and the data recording unit 333 starts recording of received data.

Subsequently, in the control device 271, the control-instruction transmitting unit 321 transmits an image data output start command respectively to the first to third pantograph cameras 201 to 203. The command includes "X" (the number of pixels) as image resolution, "A" (fps) as an image generation interval, and IP addresses of the control device 271 and the recording device 281 as transmission destinations. In the first to third pantograph cameras 201 to 203, the camera-control-instruction receiving unit 301 receives the command, the camera-data generating unit 302 starts data generation of an image having the resolution "X" at "A" (fps), and the camera-data transmitting unit 303 starts transmission of the generated data to the control device 271 and the recording device 281.

Subsequently, in the control device 271, the control-instruction transmitting unit 321 transmits an image data output start command respectively to the front camera 231 and the rear camera 233. The command includes "Y" (the number of pixels) as image resolution, "B" (fps) as an image generation interval, and the IP addresses of the control device 271 and the recording device 281 as transmission destination. In the front camera 231 and the rear camera 233, the camera-control-instruction receiving unit 301 receives the command, the camera-data generating unit 302 starts data generation of an image having the resolution "Y" at "B" (fps), and the camera-data transmitting unit 303 starts transmission of the generated data to the control device 271 and the recording device 281.

Subsequently, in the control device 271, the control-instruction transmitting unit 321 transmits an image data output start command respectively to the first to third truck cameras 241 to 243. The command includes "Z" (the number of pixels) as image resolution, "C" (fps) as an image generation interval, and the IP addresses of the control device 271 and the recording device 281 as transmission destinations. In the first to third truck cameras 241 to 243, the camera-control-instruction receiving unit 301 receives the command, the camera-data generating unit 302 starts data generation of an image having the resolution "Z" at "C" (fps), and the camera-data transmitting unit 303 starts transmission of the generated data to the control device 271 and the recording device 281.

Subsequently, in the control device 271, the control-instruction transmitting unit 321 transmits a sensor data output start command to the first to third pantograph noise meters 211 to 213. The command includes the IP addresses of the control device 271 and the recording device 281 as transmission destinations. In the first to third pantograph noise meters 211 to 213, the sensor-control-instruction receiving unit 311 receives the command, the sensor-data generating unit 312 starts data generation, and the sensor-data transmitting unit 313 starts transmission of the generated data to the control device 271 and the recording device 281.

Subsequently, in the control device 271, the control-instruction transmitting unit 321 transmits a sensor data output start command respectively to the first to third illuminometers 221 to 223. The command includes the IP addresses of the control device 271 and the recording device 281 as transmission destinations. In the first to third illuminometers 221 to 223, the sensor-control-instruction receiving unit 311 receives the command, the sensor-data generating unit 312 starts data generation, and the sensor-data transmitting unit 313 starts transmission of the generated data to the control device 271 and the recording device 281.

Subsequently, in the control device 271, the control-instruction transmitting unit 321 transmits a sensor data output start command respectively to the first to third truck noise meters 251 to 253. The command includes the IP addresses of the control device 271 and the recording device 281 as transmission destinations. In the first to third truck noise meters 251 to 253, the sensor-control-instruction receiving unit 311 receives the command, the sensor-data generating unit 312 starts data generation, and the sensor-data transmitting unit 313 starts transmission of the generated data to the control device 271 and the recording device 281.

Subsequently, in the control device 271, the control-instruction transmitting unit 321 transmits a sensor data output start command respectively to the first to third vibrometers 261 to 263. The command includes the IP addresses of the control device 271 and the recording device 281 as transmission destinations. In the first to third vibrometers 261 to 263, the sensor-control-instruction receiving unit 311 receives the command, the sensor-data generating unit 312 starts data generation, and the sensor-data transmitting unit 313 starts transmission of the generated data to the control device 271 and the recording device 281.

Subsequently, in the control device 271, the control-instruction transmitting unit 321 transmits a data display start command to the display device 291. In the display device 291, the display-control-instruction receiving unit 341 receives the command, the display-data receiving unit 342 starts data reception from the recording device 281, and the data display unit 343 starts display of the received data.

Subsequently, in the control device 271, the control-instruction transmitting unit 321 transmits a recording data output start command to the recording device 281. The command includes present time as a reproduction start point and an IP address of the display device 291 as a transmission destination. In the recording device 281, the recording-control-instruction receiving unit 331 receives the command, the data recording unit 333 starts readout of recorded data, and the recording-data transmitting unit 334 starts transmission of the read-out data.

According to the series of initial control processing, the train monitoring system 100 starts data generation and recording and display of the data. In this state, the train (the first to third cars 101 to 103) is operated.

Figure 4:
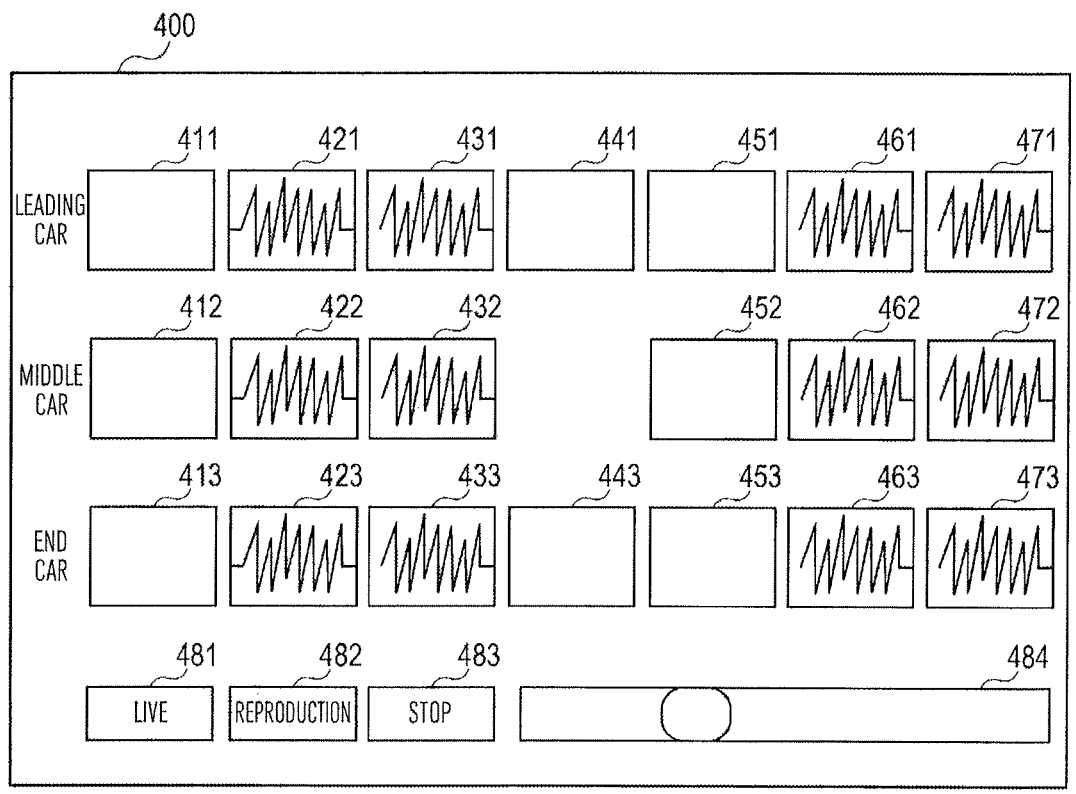
FIG. 4 is a diagram showing a screen example of the display device in the embodiment of the present invention.

An example of a screen 400 displayed on the display device 291 in the train monitoring system 100 is shown in FIG. 4. The screen 400 includes first to third pantograph image data display regions 411 to 413, first to third pantograph noise data display regions 421 to 423, first to third illuminance data display regions 431 to 433, a front image data display region 441, a rear image data display region 443, first to third truck image data display region 451 to 453, first to third truck noise data display regions 461 to 463, first to third vibration data display regions 471 to 473, a live button 481, a reproduction button 482, a stop button 483, and a reproduction start position designation bar 484.

The first to third pantograph image data display regions 411 to 413 are regions for respectively continuously displaying image data of the first to third pantograph cameras 201 to 203 in arrangement associated with a setting form of the cameras. In the regions, image data time is also displayed besides images. The display is automatically updated. The automatic update is realized by repeating, at every image generation interval "A" (fps) of the pantograph cameras, reception by the display-data receiving unit 342 of the display device 291 of image data of the pantograph cameras transmitted by the recording device 281 and display of the received data by the data display unit 343.

The first to third pantograph noise data display regions 421 to 423 are regions for respectively continuously displaying noise data of the first to third pantograph noise meters 211 to 213 in arrangement associated with a setting form of the noise meters. Noise levels are displayed as waveforms in time series from the right to the left in the regions. The display is automatically updated while sliding the waveforms from the left to the right according to elapse of time. The waveforms are configured by line segments colored in green, yellow, red, and the like according to levels of values of the waveforms. Highlighting of the regions can be performed, for example, the outer peripheries of the regions can be surrounded by red thick lines in order to inform event occurrence to the user.

The first to third illuminance data display regions 431 to 433 are regions for respectively continuously displaying illuminance data of the first to third illuminometers 221 to 223 in arrangement associated with a setting form of the illuminometers. Illuminance levels are displayed as waveforms in time series from the right to the left in the regions. The display is automatically updated while sliding the waveforms from the left to the right according to elapse of time. The waveforms are configured by line segments colored in green, yellow, red, and the like according to levels of values of the waveforms. Highlighting of the regions can be performed, for example, the outer peripheries of the regions can be surrounded by red thick lines in order to inform event occurrence to the user.

The front image data display region 441 and the rear image data display region 443 are regions for respectively continuously displaying image data of the front camera 231 and the rear camera 233 in arrangement associated with a setting form of the cameras. Image data time is also displayed in the regions besides images. The display is automatically updated. The automatic update is realized by repeating, at every image generation interval "B" (fps) of the front camera and the rear camera, reception by the display-data receiving unit 342 of the display device 291 of image data of the front camera and the rear camera transmitted by the recording device 281 and display of the received data by the data display unit 343.

The first to third truck image data display regions 451 to 453 are regions for respectively continuously displaying image data of the first to third truck cameras 241 to 243 in arrangement associated with a setting form of the cameras. Image data time is also displayed in the regions besides images. The display is automatically updated. The automatic update is realized by repeating, at every image generation interval "C" (fps) of the truck cameras, reception by the display-data receiving unit 342 of the display device 291 of image data of the truck cameras transmitted by the recording device 281 and display of the received data by the data display unit 343.

The first to third truck noise data display regions 461 to 463 are regions for respectively continuously displaying noise data of the first to third truck noise meters 251 to 253 in arrangement associated with a setting form of the noise meters. Noise levels are displayed as waveforms in time series from the right to the left in the regions. The display is automatically updated while sliding the waveforms from the left to the right according to elapse of time. The waveforms are configured by line segments colored in green, yellow, red, and the like according to levels of values of the waveforms. Highlighting of the regions can be performed, for example, the outer peripheries of the regions can be surrounded by red thick lines in order to inform event occurrence to the user.

The first to third vibration data display regions 471 to 473 are regions for respectively continuously displaying vibration data of the first to third vibrometers 261 to 263. Vibration levels are displayed as waveforms in time series from the right to the left in the regions. The display is automatically updated while sliding the waveforms from the left to the right according to elapse of time. The waveforms are configured by line segments colored in green, yellow, red, and the like according to levels of values of the waveforms. Highlighting of the regions can be performed, for example, the outer peripheries of the regions can be surrounded by red thick lines in order to inform event occurrence to the user.

The regions explained above can also be displayed in full screen when the regions are double-clicked by the mouse or the touch panel. In that case, the regions return to the screen 400 when the regions are further double-clicked.

The live button 481 is a button for switching contents displayed in the display regions to display based on present data. When the user presses the live button 481, in the display device 291, the screen-operation detecting unit 344 detects the pressing of the live button 481 and the display-data transmitting unit 345 transmits the live button pressing to the control device 271 as operation data. In the control device 271, the system-data receiving unit 322 receives the live button pressing and the control-instruction transmitting unit 321 transmits a recording data output start command, in which present time is set as a reproduction start point, to the recording device 281. In the recording device 281, the recording-control-instruction receiving unit 331 receives the command, the data recording unit 333 starts readout of data corresponding to a request, and the recording-data transmitting unit 334 starts transmission of the read-out data.

The reproduction button 482 is a button for switching contents displayed in the display regions to display based on data in the past. When the user presses the reproduction button 482, in the display device 291, the screen-operation detecting unit 344 detects the pressing of the reproduction button 482 and the display-data transmitting unit 345 transmits the reproduction button pressing to the control device 271 as operation data. When transmitting the reproduction button pressing, the display-data transmitting unit 345 also transmits past time selected by the reproduction start position designation bar 484 explained below. In the control device 271, the system-data receiving unit 322 receives the reproduction button pressing and the control-instruction transmitting unit 321 transmits a recording data output start command, in which the past time is set as a reproduction start point, to the recording device 281. In the recording device 281, the recording-control-instruction receiving unit 331 receives the command, the data recording unit 333 starts readout of data corresponding to a request, and the recording-data transmitting unit 334 starts transmission of the read-out data.

The stop button 483 is a button for temporarily stopping the automatic update in the display regions. When the user presses the stop button 483, in the display device 291, the screen-operation detecting unit 344 detects the pressing of the stop button 483 and the display-data transmitting unit 345 transmits the stop button pressing to the control device 271 as operation data. In the control device 271, the system-data receiving unit 322 receives the stop button pressing and the control-instruction transmitting unit 321 transmits a recording data output stop command to the recording device 281. In the recording device 281, the recording-control-instruction receiving unit 331 receives the command and the data recording unit stops the readout of the data.

The reproduction start position designation bar 484 is a bar for designating past time when reproduction is started. The bar is in time series from the left to the right. Old time can be designated by sliding a dial of the bar to the left and new time can be designated by sliding the dial of the bar to the right.

<Link Content 1>

Link content in the case in which abnormal noise occurs around the pantograph 104 of the first car 101, which is the leading car, during train traveling in the train monitoring system 100 is explained. As the abnormal noise, excessively large noise equal to or larger than a fixed value occurs.

In the first pantograph noise meter 211, the sensor-data generating unit 312 converts the noise into data and the sensor-data generating unit 312 transmits the generated data to the recording device 281 and the control device 271.

In the recording device 281, the recording-data receiving unit 332 receives the data and the data recording unit 333 records the received data.

In the control device 271, the system-data receiving unit 322 receives the data and the system control unit 324 determines whether the received data is excessively large. The determination is carried out by magnitude comparison with a threshold for pantograph noise TH1 given in advance and retained in the system control unit 324.

When it is determined that the received data is excessively large, in the control device 271, the control-instruction transmitting unit 321 transmits an illumination amount increase command respectively to the second pantograph camera 202 of the second car 102 and the third pantograph camera 203 of the third car 103, the second car 102 and the third car 103 being the cars in the rear in the traveling direction.

In the second pantograph camera 202, the camera-control-instruction receiving unit 301 receives the command and the illuminating unit 304 increases an illumination amount. The same applies to the third pantograph camera 203.

Similarly, when it is determined that received data is excessively large, in the control device 271, the control-instruction transmitting unit 321 transmits an image data output start command respectively to the second pantograph camera 202 of the second car 102 and the third pantograph camera 203 of the third car 103, the second car 102 and the third car 103 being the cars in the rear in the traveling direction. The command includes "x" (pixels) as image resolution, "a" (fps) as an image generation interval, and the IP addresses of the control device 271 and the recording device 281 as transmission destinations: "x" has a relation of X<x and "a" has a relation of A<a.

In the second pantograph camera 202, the camera-control-instruction receiving unit 301 receives the command, the camera-data generating unit 302 changes the image resolution from "X" (pixels) to "x" (pixels) and changes the data generation interval from "A" (fps) to "a" (fps), and the camera-data transmitting unit 303 resumes the transmission of the generated data to the control device 271 and the recording device 281. The same applies to the third pantograph camera 203.

Similarly, when it is determined that received data is excessively large, in the control device 271, the control-instruction transmitting unit 321 transmits an event recording command to the recording device 281. The command includes excessively large noise as an event type and an IP address of the first pantograph noise meter 211 as a generation target.

In the recording device 281, the recording-control-instruction receiving unit 331 receives the command and the data recording unit 333 records an event.

Similarly, when it is determined that received data is excessively large, in the control device 271, the control-instruction transmitting unit 321 transmits a highlighting command to the display device 291. The command includes the first pantograph noise data display region 421 as a highlighting target.

In the display device 291, the display-control-instruction receiving unit 341 receives the command and the data display unit 343 highlights the first pantograph noise data display region 421.

According to the above explanation, when excessively large noise occurs during traveling, it is possible to confirm states of an overhead wire and a pantograph and around the overhead wire and the pantograph at a point in time of the occurrence with a brighter and finer image with a higher movie property output from a pantograph camera of a car in the rear. This is effective in investigating a cause of the noise, for example, slack of the overhead wire.

According to the above explanation, it is possible to confirm occurrence of excessively large noise around the pantograph during the traveling on a real-time basis on the display device 291.

In this example, the detection of the excessively large noise by the first pantograph noise meter 211 of the first car 101 is explained as a trigger of a link start. However, a device serving as the trigger may be the second pantograph noise meter 212 of the second car 102 or the third pantograph noise meter 213 of the third car 103.

In this example, the example is explained in which, when the excessively large noise is detected by the first pantograph noise meter 211 of the first car 101, the second pantograph camera 202 of the second car 102 and the third pantograph camera 203 of the third car 103 are controlled at a time. However, as another example, only the second pantograph camera 202 of the second car 102 may be controlled, the determination may be performed again by the control device 271 targeting noise data output from the second pantograph noise meter 212 of the second car 102, and, when a result of the determination indicates that the noise data is excessively large, the third pantograph camera 203 of the third car 103 may be controlled. In that case, the control device 271 transmits a highlighting command targeting the second pantograph noise data display region 422 to the display device 291. In the display device 291, the display-control-instruction receiving unit 341 receives the command and the data display unit 343 highlights the second pantograph noise data display region 422.

Following the above, the control device 271 performs determination targeting noise data output from the third pantograph noise meter 213 of the third car 103. When a result of the determination indicates that the noise data is excessively large, the control device 271 transmits a highlighting command targeting the third pantograph noise data display region 423 to the display device 291. In the display device 291, the display-control-instruction receiving unit 341 receives the command and the data display unit 343 highlights the third pantograph noise data display region 423.

According to the above explanation, when only the first pantograph noise data display region 421 is highlighted in the screen 400 on the display device 291, the user can learn that it is highly likely that a cause of the excessively large noise occurrence is present on the pantograph 104 side. When a plurality of pantograph noise data display regions among the first to third pantograph noise data display regions 421 to 423 are highlighted, the user can learn that it is highly likely that the cause is present on an infrastructure side, in this example, in the overhead wire 107 or the like.

<Link Content 2>

Link content in the case in which abnormal noise occurs around the truck 105 of the first car 101, which is the leading car, during the train traveling in the train monitoring system 100 is explained. Excessively large noise equal to or larger than a fixed value is explained as the abnormal noise.

In the truck noise meter 251, the sensor-data generating unit 312 converts the noise into data and the sensor-data generating unit 312 transmits the generated data to the recording device 281 and the control device 271.

In the recording device 281, the recording-data receiving unit 332 receives the data and the data recording unit 333 records the received data.

In the control device 271, the system-data receiving unit 322 receives the data and the system control unit 324 determines whether the received data is excessively large. The determination is carried out by magnitude comparison with a threshold for truck noise TH2 given in advance and retained in the system control unit 324.

When it is determined that the received data is excessively large, in the control device 271, the control-instruction transmitting unit 321 transmits an illumination amount increase command to the second truck camera 242 of the second car 102 and the third truck camera 243 and the rear camera 233 of the third car 103, the second car 102 and the third car 103 being the cars in the rear in the traveling direction.

In the second truck camera 242, the camera-control-instruction receiving unit 301 receives the command and the illuminating unit 304 increases an illumination amount. The same applies to the third truck camera 243 and the rear camera 233.

Similarly, when it is determined that the received data is excessively large, in the control device 271, the control-instruction transmitting unit 321 transmits an image data output start command respectively to the second truck camera 242 of the second car 102 and the third truck camera 243 of the third car 103, the second car 102 and the third car 103 being the cars in the rear in the traveling direction. The command includes "z" (pixels) as image resolution, "c" (fps) as an image generation interval, and the IP addresses of the control device 271 and the recording device 281 as transmission destinations: "z" has a relation of Z<z and "c" has a relation of C<c.

In the second truck camera 242, the camera-control-instruction receiving unit 301 receives the command, the camera-data generating unit 302 changes the image resolution from "Z" (pixels) to "z" (pixels) and changes the data generation interval from "C" (fps) to "c" (fps), and the camera-data transmitting unit 303 resumes the transmission of the generated data to the control device 271 and the recording device 281. The same applies to the third truck camera 243.

Similarly, when it is determined that the received data is excessively large, in the control device 271, the control-instruction transmitting unit 321 transmits an image data output start command to the rear camera 233 of the third car 103, which is the car in the rear in the traveling direction. The command includes "y" (pixels) as image resolution, "b" (fps) as an image generation interval, and the IP addresses of the control device 271 and the recording device 281 as transmission destinations: "y" has a relation of Y<y and "b" has a relation of B<b.

In the rear camera 233, the camera-control-instruction receiving unit 301 receives the command, the camera-data generating unit 302 changes the image resolution from "Y" (pixels) to "y" (pixels) and changes the data generation interval from "B" (fps) to "b" (fps), and the camera-data transmitting unit 303 resumes the transmission of the generated data to the control device 271 and the recording device 281.

Similarly, when it is determined that the received data is excessively large, in the control device 271, the control-instruction transmitting unit 321 transmits an event recording command to the recording device 281. The command includes excessively large noise as an event type and an IP address of the first truck noise meter 251 as a generation target.

In the recording device 281, the recording-control-instruction receiving unit 331 receives the command and the data recording unit 333 records an event.

Similarly, when it is determined that the received data is excessively large, in the control device 271, the control-instruction transmitting unit 321 transmits a highlighting command to the display device 291. The command includes the first truck noise data display region 461 as a highlighting target.

In the display device 291, the display-control-instruction receiving unit 341 receives the command and the data display unit 343 highlights the first truck noise data display region 461.

According to the above explanation, when excessively large noise occurs during traveling, it is possible to confirm states of a railroad and a truck and around the railroad and the truck at a point in time of the occurrence with a brighter and finer image with a higher movie property output from a truck camera and a rear camera of a car in the rear. This is effective in investigating a cause of the noise, for example, distortion of the railroad 108 and a step.

According to the above explanation, it is possible to confirm occurrence of excessively large noise around the truck 105 during the traveling on a real-time basis on the display device 291.

In this example, the detection of the excessively large noise by the first truck noise meter 251 of the first car 101 is explained as a trigger of a link start. However, a device serving as the trigger may be the second truck noise meter 252 of the second car 102 or the third truck noise meter 253 of the third car 103.

In this example, the example is explained in which, when the excessively large noise is detected by the first truck noise meter 251 of the first car 101, the second truck camera 242 of the second car 102 and the third truck camera 243 and the rear camera 233 of the third car 103 are controlled at a time. However, as another example, only the second truck camera 242 of the second car 102 may be controlled, the determination may be performed again by the control device 271 targeting noise data output from the second truck noise meter 252 of the second car 102, and, when a result of the determination indicates that the noise data is excessively large, the third truck camera 243 and the rear camera 233 of the third car 103 may be controlled.

In that case, the control device 271 transmits a highlighting command targeting the second truck noise data display region 462 to the display device 291. In the display device 291, the display-control-instruction receiving unit 341 receives the command and the data display unit 343 highlights the second truck noise data display region 462.

Following the above, the control device 271 performs determination targeting noise data output from the third truck noise meter 253 of the third car 103. When a result of the determination indicates that the noise data is excessively large, the control device 271 transmits a highlighting command targeting the third truck noise data display region 463 to the display device 291. In the display device 291, the display-control-instruction receiving unit 341 receives the command and the data display unit 343 highlights the third truck noise data display region 463.

According to the above explanation, when only the first truck noise data display region 461 is highlighted in the screen 400 on the display device 291, the user can learn that it is highly likely that a cause of the excessively large noise occurrence is present on the truck 105 side. When a plurality of truck noise data display regions among the first to third truck noise data display regions 461 to 463 are highlighted, the user can learn that it is highly likely that the cause is present on an infrastructure side, in this example, in the railroad 108 or the like.

<Link Content 3>

Link content in the case in which abnormal vibration occurs in the first car 101, which is the leading car, during train traveling in the train monitoring system 100 is explained. Excessively large vibration equal to or larger than a fixed value is explained as the abnormal vibration.

In the first vibrometer 261, the sensor-data generating unit 312 converts the vibration into data and the sensor-data transmitting unit 313 transmits the generated data to the recording device 281 and the control device 271.

In the recording device 281, the recording-data receiving unit 332 receives the data and the data recording unit 333 records the received data.

In the control device 271, the system-data receiving unit 322 receives the data and the system control unit 324 determines whether the received data is excessively large. The determination is carried out by magnitude comparison with a threshold for vibration TH3 given in advance and retained in the system control unit 324.

When it is determined that the received data is excessively large, in the control device 271, the control-instruction transmitting unit 321 transmits an illumination amount increase command to the second pantograph camera 202 and the second truck camera 242 of the second car 102 and the third pantograph camera 203, the third truck camera 243, and the rear camera 233 of the third car 103, the second car 102 and the third car 103 being the cars in the rear in the traveling direction.

In the second pantograph camera 202, the camera-control-instruction receiving unit 301 receives the command and the illuminating unit 304 increases an illumination amount. The same applies to the second truck camera 242, the third pantograph camera 203, the third truck camera 243, and the rear camera 233.

Similarly, when it is determined that received data is excessively large, in the control device 271, the control-instruction transmitting unit 321 transmits an image data output start command respectively to the second pantograph camera 202 of the second car 102 and the third pantograph camera 203 of the third car 103, the second car 102 and the third car 103 being the cars in the rear in the traveling direction. The command includes "x" (pixels) as image resolution, "a" (fps) as an image generation interval, and the IP addresses of the control device 271 and the recording device 281 as transmission destinations: "x" has a relation of X<x and "a" has a relation of A<a.

In the second pantograph camera 202, the camera-control-instruction receiving unit 301 receives the command, the camera-data generating unit 302 changes the image resolution from "X" (pixels) to "x" (pixels) and changes the data generation interval from "A" (fps) to "a" (fps), and the camera-data transmitting unit 303 resumes the transmission of the generated data to the control device 271 and the recording device 281. The same applies to the third pantograph camera 203.

Similarly, when it is determined that received data is excessively large, in the control device 271, the control-instruction transmitting unit 321 transmits an image data output start command to the second truck camera 242 of the second car 102 and the third truck camera 243 of the third car 103, the second car 102 and the third car 103 being the cars in the rear in the traveling direction. The command includes "z" (pixels) as image resolution, "c" (fps) as an image generation interval, and the IP addresses of the control device 271 and the recording device 281 as transmission destinations: "z" has a relation of Z<z and "c" has a relation of C<c.

In the second truck camera 242, the camera-control-instruction receiving unit 301 receives the command, the camera-data generating unit 302 changes the image resolution from "Z" (pixels) to "z" (pixels) and changes the data generation interval from "C" (fps) to "c" (fps), and the camera-data transmitting unit 303 resumes the transmission of the generated data to the control device 271 and the recording device 281. The same applies to the third truck camera 243.

Similarly, when it is determined that the received data is excessively large, in the control device 271, the control-instruction transmitting unit 321 transmits an image data output start command to the rear camera 233 of the third car 103, which is the car in the rear in the traveling direction. The command includes "y" (pixels) as image resolution, "b" (fps) as an image generation interval, and the IP addresses of the control device 271 and the recording device 281 as transmission destinations: "y" has a relation of Y<y and "b" has a relation of B<b.

In the rear camera 233, the camera-control-instruction receiving unit 301 receives the command, the camera-data generating unit 302 changes the image resolution from "Y" (pixels) to "y" (pixels) and changes the data generation interval from "B" (fps) to "b" (fps), and the camera-data transmitting unit 303 resumes the transmission of the generated data to the control device 271 and the recording device 281.

Similarly, when it is determined that the received data is excessively large, in the control device 271, the control-instruction transmitting unit 321 transmits an event recording command to the recording device 281. The command includes excessively large vibration as an event type and an IP address of the first vibrometer 261 as a generation target.

In the recording device 281, the recording-control-instruction receiving unit 331 receives the command and the data recording unit 333 records an event.

Similarly, when it is determined that the received data is excessively large, in the control device 271, the control-instruction transmitting unit 321 transmits a highlighting command to the display device 291. The command includes the first vibration data display region 471 as a highlighting target.

In the display device 291, the display-control-instruction receiving unit 341 receives the command and the data display unit 343 highlights the first vibration data display region 471.

According to the above explanation, when excessively large noise occurs during traveling, it is possible to confirm a state around the car at a point in time of the occurrence with a brighter and finer image with a higher movie property output from cameras of a car in the rear. This is effective in investigating a cause of the vibration.

According to the above explanation, it is possible to confirm occurrence of excessively large vibration during the traveling on a real-time basis on the display device 291.

In this example, the detection of the excessively large vibration by the first vibrometer 261 of the first car 101 is explained as a trigger of a link start. However, a device serving as the trigger may be the second vibrometer 262 of the second car 102 or the third vibrometer 263 of the third car 103.

In this example, the example is explained in which, when the excessively large vibration is detected by the first vibrometer 261 of the first car 101, the second pantograph camera 202 and the second truck camera 242 of the second car 102 and the third pantograph camera 203, the third truck camera 243, and the rear camera 233 of the third car 103 are controlled at a time. However, as another example, only the second pantograph camera 202 and the second truck camera 242 of the second car 102 may be controlled, the determination may be performed again by the control device 271 targeting vibration data output from the second vibrometer 262 of the second car 102, and, when a result of the determination indicates that the vibration data is excessively large, the third pantograph camera 203, the third truck camera 243, and the rear camera 233 of the third car 103 may be controlled. In that case, the control device 271 transmits a highlighting command targeting the second vibration data display region 472 to the display device 291. In the display device 291, the display-control-instruction receiving unit 341 receives the command and the data display unit 343 highlights the second truck noise data display region 462.

Following the above, the control device 271 performs determination targeting vibration data output from the third vibrometer 263 of the third car 103. When a result of the determination indicates that the vibration data is excessively large, the control device 271 transmits a highlighting command targeting the third vibration data display region 473 to the display device 291. In the display device 291, the display-control-instruction receiving unit 341 receives the command and the data display unit 343 highlights the third vibration data display region 473.

According to the above explanation, when only the first vibration data display region 471 is highlighted in the screen 400 on the display device 291, the user can learn that it is highly likely that a cause of the excessively large vibration occurrence is present on the first car 101 side. When a plurality of vibration data display regions among the first to third vibration data display regions 471 to 473 are highlighted, the user can learn that it is highly likely that the cause is present on an infrastructure side.

<Link Content 4>

Link content in the case in which the train enters a tunnel during the train traveling in the train monitoring system 100 is explained.

In the first illuminometer 221, the sensor-data generating unit 312 converts illuminance of the first illuminometer 221 into data and the sensor-data generating unit 312 transmits the generated data to the recording device 281 and the control device 271.

In the recording device 281, the recording-data receiving unit 332 receives the data and the data recording unit 333 records the received data.

In the control device 271, the system-data receiving unit 322 receives the data and the system control unit 324 determines occurrence of tunnel entrance, that is, a sudden luminance drop. The determination is carried out by retaining illuminance data received so far, calculating an illuminance change amount from the data in the past and data of this time, and performing magnitude comparison of the illuminance change amount and a threshold TH3 given in advance and retained in the system control unit 324.

When determining that the tunnel entrance occurs, the control device 271 changes the threshold for pantograph noise TH1 and the threshold for truck noise TH2 retained by the system control unit 324 respectively to a threshold for pantograph noise for tunnel TH4 and a threshold for truck noise for tunnel TH5. The threshold for pantograph noise for tunnel TH4 and the threshold for truck noise for tunnel TH5 are also given in advance like the threshold for pantograph noise TH1 and the threshold for truck noise TH2 and have relations of TH1<TH4 and TH2<TH5.

When the train comes out from the tunnel, similarly, the determination of occurrence of a sudden illuminance rise is performed. The threshold for pantograph noise for tunnel TH4 is changed to the threshold for pantograph noise TH1. The threshold for truck noise for tunnel TH5 is changed to the threshold for truck noise TH2.

According to the above explanation, it is possible to perform link with amplification of noise due to echo in the tunnel while removing the influence of the amplification.

In this example, the detection of the sudden illuminance drop by the first illuminometer 221 of the first car 101 is explained as a trigger of a link start. However, a device serving as the trigger may be the second illuminometer 222 of the second car 102 or the third illuminometer 223 of the third car 103.

The above is the explanation of the link contents. It is possible to more effectively use images by applying control to devices in a rear car according to detection content in a front car.

In the above explanation, for simplification of explanation, the train of the three-car formation of the first to third cars 101 to 103 is explained. However, the train may be implemented in a formation of four or more cars.

Similarly, the configuration is explained in which the control device 271, the recording device 281, and the display device 291 are the separate devices. However, the control device 271, the recording device 281, and the display device 291 may be implemented as the same device. Similarly, the configuration is explained in which the control device 271 and the recording device 281 are the separate devices. However, the control device 271 and the recording device 281 may be implemented as the same device. Similarly, the configuration is explained in which the control device 271 and the display device 291 are the separate devices. However, the control device 271 and the display device 291 may be implemented as the same device. Similarly, the configuration is explained in which the recording device 281 and the display device 291 are the separate devices. However, the recording device 281 and the display device 291 may be implemented as the same device.

Similarly, the configuration is explained in which the pantograph cameras and the pantograph noise meters of the cars are the separate devices. However, the pantograph cameras and the pantograph noise meters of the cars may be implemented as the same devices. Similarly, the configuration is explained in which the truck cameras and the truck noise meters of the cars are the separate devices. However, the truck cameras and the truck noise meters of the cars may be implemented as the same devices.

The example is explained in which the threshold comparison processing for the noise data is carried out in the control device. However, the processing may be carried out in the pantograph noise meters and the truck noise meters and a result of the processing may be transmitted to the control device 271. The example is explained in which the threshold comparison processing for the vibration data is carried out by the control device 271. However, the processing may be carried out by the vibrometers and a result of the processing may be transmitted to the control device 271.

The example is explained in which the threshold comparison processing for the illuminance data is carried out by the control device. However, the processing may be carried out by the illuminometers and a result of the processing may be transmitted to the control device 271.

The present invention is explained above based on the embodiment. This embodiment is illustration. Those skilled in the art would understand that various modifications are possible in combinations of the components in the embodiment and such modifications are also within the scope of the present invention.

REFERENCE SIGNS LIST 11 first car monitoring system
12 second car monitoring system
13 third car monitoring system
100 train monitoring system
101 first car
102 second car
103 third car
104 pantograph
105 truck
106 network
107 overhead wire
108 railroad
109 left arrow
201 first pantograph camera
202 second pantograph camera
203 third pantograph camera
211 first pantograph noise meter
212 second pantograph noise meter
213 third pantograph noise meter
221 first illuminometer
222 second illuminometer
223 third illuminometer
231 front camera
233 rear camera
241 first truck camera
242 second truck camera
243 third truck camera
251 first truck noise meter
252 second truck noise meter
253 third truck noise meter
261 first vibrometer
262 second vibrometer
263 third vibrometer
271 control device
281 recording device
291 display device
300 camera
301 camera-control-instruction receiving unit
302 camera-data generating unit
303 camera-data transmitting unit
304 illuminating unit
310 sensor
311 sensor-control-instruction receiving unit
312 sensor-data generating unit
313 sensor-data transmitting unit
321 control-instruction transmitting unit
322 system-data receiving unit
323 system-configuration managing unit
324 system control unit
331 recording-control-instruction receiving unit
332 recording-data receiving unit
333 data recording unit
334 recording-data transmitting unit
341 display-control-instruction receiving unit
342 display-data receiving unit
343 data display unit
344 screen-operation detecting unit
345 display-data transmitting unit
400 screen
411 first pantograph image data display region
412 second pantograph image data display region
413 third pantograph image data display region
421 first pantograph noise data display region
422 second pantograph noise data display region
423 third pantograph noise data display region
431 first illuminance data display region
432 second illuminance data display region
433 third illuminance data display region
441 front image data display region
443 rear image data display region
451 first truck image data display region
452 second truck image data display region
453 third truck image data display region
461 first truck noise data display region
462 second truck noise data display region 463 third truck noise data display region
471 first vibration data display region
472 second vibration data display region
473 third vibration data display region
481 live button
482 reproduction button
483 stop button
484 reproduction start position designation bar

The invention claimed is:

1. A train image monitoring system in which cameras, sensors that acquire surrounding situations, and a control device that controls the cameras and the sensors are connected by a network and mounted on a train, wherein
the cameras and the sensors are mounted on a plurality of cars that form the train,
the sensors can be linked with the cameras, and
the control device executes, based on data of (i) at least one of the cameras which is mounted on one car or (ii) at least one of the sensors which is mounted on the one car, linked control for controlling operations of the cameras or the sensors in other cars, and
the control device determines, based on illuminance data from a light sensor among the sensors, an occurrence of a tunnel entrance, and upon determining the occurrence of the tunnel entrance, executes linked control to change a first noise threshold of a noise sensor among the sensors, to a higher noise threshold.

2. The train image monitoring system according to claim 1, further comprising:
a display device that displays data of the cameras and the sensors in association with a setting form of the cameras and the sensors in the train is connected by the network,
wherein, when the linked control is executed, the display device distinguishably displays the linked cameras or sensors.

3. The train image monitoring system according to claim 1, further comprising:
a display device that displays data of the cameras and the sensors in association with a setting form of the cameras and the sensors in the train is connected by the network, wherein
the control device executes the linked control when a threshold of the data of the sensors is exceeded, and
the display device distinguishably displays the data of the sensors exceeding the threshold.

4. The train image monitoring system according to claim 3, wherein
at least one of the sensors is an illuminometer, and
the control device stores therein a first threshold used outside a tunnel and a second threshold used inside the tunnel and switches the first threshold to the second threshold when illuminance data of the illuminometer falls and switch the second threshold to the first threshold when the illuminance data of the illuminometer rises.

5. The train image monitoring system according to claim 1, wherein the control device detects the occurrence of the tunnel entrance when the control device determines there is an illuminance drop from the illuminance data of the light sensor.

6. The train image monitoring system according to claim 1, wherein the control device registers the illuminance data of the light sensor, and each time the control device receives new illuminance data from the light sensor, the control device compares the new illuminance data from the light sensor to the previously registered illuminance data and determines the occurrence of the tunnel entrance when the new illuminance data exceeds the previously registered illuminance data by an illuminance change amount greater than a predetermined illuminance threshold.

7. The train image monitoring system according to claim 6, wherein after the control device detects the occurrence of the tunnel entrance, the control device continues to compare new received illuminance data from the light sensor to already registered illuminance data and the control device determines an occurrence of a tunnel exit when there is an increase in illuminance amount.

8. The train image monitoring system according to claim 7, wherein when the control device detects the occurrence of the tunnel exit, the control device executes linked control to change the higher noise threshold of the noise sensor back to the first noise threshold.

9. A train image monitoring system in which sensors that acquire surrounding situations and a control device that controls the sensors are connected by a network and mounted on a train, wherein
the sensors are mounted on a plurality of cars that form the train, and
the control device executes, based on data of at least one of the sensors which is mounted on one car, linked control for controlling operations of the sensors in other cars, and
the control device determines an occurrence of an illuminance drop, based on illuminance data from a light sensor among the sensors, and upon determining the occurrence of an illuminance drop, executes linked control to change a first noise threshold of a noise sensor among the sensors, to a higher noise threshold.

10. The train image monitoring system according to claim 9, wherein the control device registers the illuminance data of the light sensor, and each time the control device receives new illuminance data from the light sensor, the control device compares the new illuminance data from the light sensor to the previously registered illuminance data and determines the occurrence of an illuminance drop when the new illuminance data exceeds the previously registered illuminance data by an illuminance change amount greater than a predetermined illuminance threshold.

11. The train image monitoring system according to claim 10, wherein after the control device detects the occurrence of an illuminance drop, the control device continues to compare new received illuminance data from the light sensor to already registered illuminance data and when the control device detects an increase in illuminance amount, by comparing the new received illuminance data from the light sensor to the already registered illuminance data, the control device executes linked control to change the higher noise threshold of the noise sensor back to the first noise threshold.

12. A train image monitoring system in which sensors that acquire surrounding situations and a control device that controls the sensors are connected by a network and mounted on a train, wherein
the sensors are mounted on a plurality of cars that form the train, and
the control device executes, based on data of at least one of the sensors which is mounted on one car, linked control for controlling operations of the sensors in other cars, and
the control device determines, based on data from at least one sensor among the sensors, an occurrence of a tunnel entrance, and upon determining the occurrence of tunnel entrance, executes linked control to change a first noise threshold of a noise sensor among the sensors, to a higher noise threshold.

* * * * *